(Model.)

R. MILLS.
GANG PLOW.

No. 251,271.

Patented Dec. 20, 1881.

WITNESSES:
Francis McArdle
C. Sedgwick

INVENTOR:
R. Mills
BY Munn & Co.
ATTORNEYS.

UNITED STATES PATENT OFFICE.

RICHARD MILLS, OF BUFFALO, ILLINOIS.

GANG-PLOW.

SPECIFICATION forming part of Letters Patent No. 251,271, dated December 20, 1881.

Application filed July 22, 1881. (Model.)

*To all whom it may concern:*

Be it known that I, RICHARD MILLS, of Buffalo, in the county of Sangamon and State of Illinois, have invented a new and useful Improvement in Gang-Plows, of which the following is a full, clear, and exact description.

Figure 1:
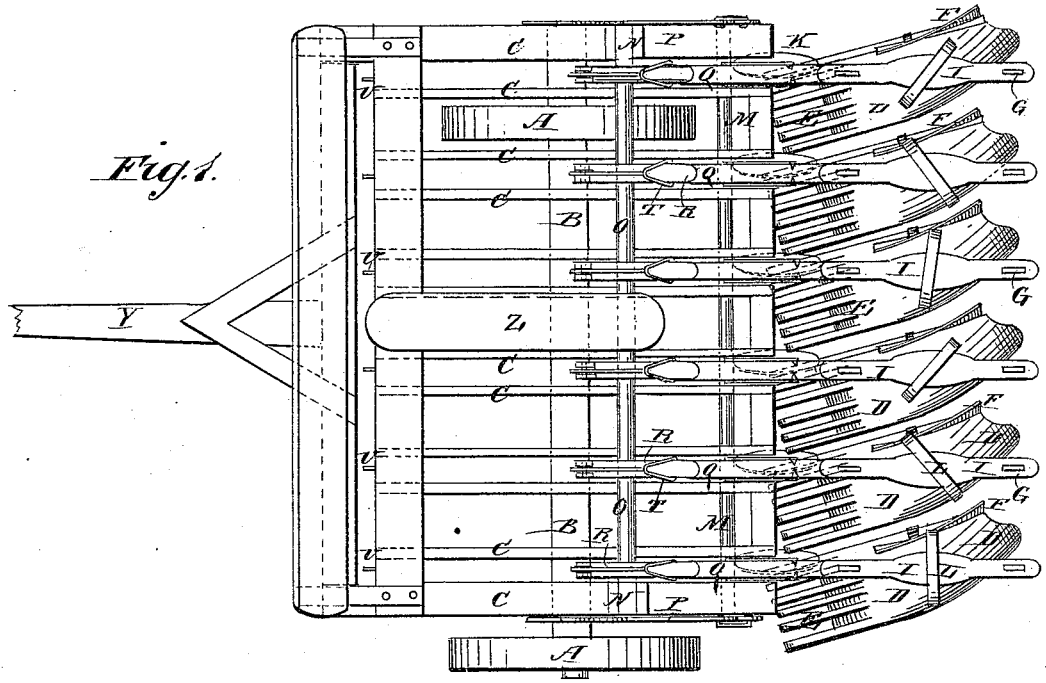
Figure 2:
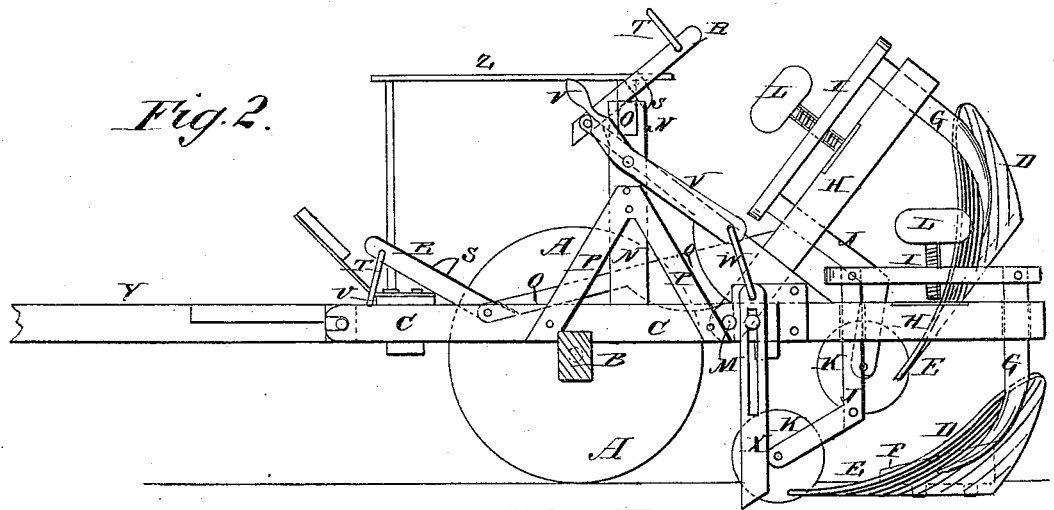
Figure 3:
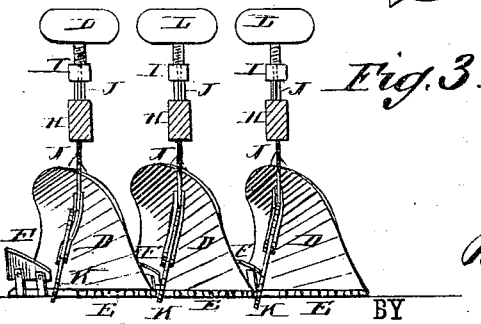

In the accompanying drawings, Figure 1 is a plan view of my improvement. Fig. 2 is a sectional side elevation of the same, showing one plow in working position and another raised from the ground. Fig. 3 is a front elevation of three plows, the plow-beams being shown in cross-section.

Similar letters of reference indicate corresponding parts.

The object of this invention is to increase the efficiency of gang-plows and simplify their construction.

The invention consists in a novel construction and arrangement of parts, as hereinafter fully described.

In the drawings, A represents the wheels, to the axle B of which is attached the frame C. The frame C is formed with as many pairs of parallel longitudinal bars as there are plows to be used, connected at their front and rear ends by cross-bars. The wheel A upon the plowed-land side of the machine is placed between the first and second pairs of longitudinal bars, so that both wheels will run upon the unplowed land and no leveling mechanism will be required.

D are the plows, which are formed of mold-boards extended forward and flattened horizontally to form shears, and having parallel prongs or fingers E formed upon or attached to their forward ends.

To the plowed-land edges of the plows D, or to studs or angle-irons attached to the said edges, are attached guides or guards F, to prevent the furrow-slices from slipping off the said mold-boards before reaching the proper point.

To the rear parts of the plows D are attached the standards G, which pass up through holes in the rear ends of the plow-beams H, and their upper ends are attached to the rear ends of the bars I. The bars I are placed above and parallel with the plow-beams H, and to their forward ends are attached the upper ends of the standards J, which pass through holes in the plow-beams H. The lower parts of the standards J are bent forward, and are slotted or made double to receive the rotary colters K. The lower parts of the standards J are bent or twisted to one side to bring the colters K into an inclined position, as shown in Figs. 1 and 3, so that the edges of the furrow-slices will be beveled to prevent the said furrow-slices from being obstructed when being raised, and to prevent the said furrow-slices from being turned in the wrong direction when leaving the mold-board.

L is a hand-screw, which passes through a screw-hole in the middle parts of the bars I, or in nuts secured to the said bars I. The forward ends of the hand-screws L are swiveled to the plow-beams H, so that the plows D and the colters K can be raised and lowered by turning the said screws L, and thus caused to work at any desired depth in the ground. The forward end of each plow-beam H is placed in a notch in the rear cross-bar of the frame C, to hold it from lateral movement, and is secured to and between the rear ends of a pair of longitudinal bars of the said frame C by a bolt, M, so that the plows can have a free vertical movement.

To the longitudinal bars of the frame C are attached the lower ends of pairs of upright bars or standards N, the upper ends of which are attached to and connected by a cross-bar, O. The outer bars, N, of the series are made stronger than the others, and are strengthened in position by braces P, attached to them and to the outer longitudinal bars of the frame C.

To the upper sides of the forward ends of the plow-beams H are attached the rear ends of the bars or levers Q, which project upward and forward at an angle of about forty-five degrees, (45°.)

To the forward end of each lever Q, at the forward side of the standard N, is hinged the rear end of the bar R in such a manner that it cannot be lowered quite into line with the said lever Q, but can be turned back freely.

To the middle part of each hinged bar R is attached, or upon it is formed, a projecting hook or pin, S, which, when the plows are in working position, can be hooked upon the cross-bar O, and will lock the plows in place. To the forward ends of the hinged bars R are hinged loops or links T, which, when the plows are raised from the ground, can be hooked upon pins U, attached to the forward cross-bar of the frame C, to support the plows in position.

To the upper parts of the side standards, N, are pivoted levers V, to the rear ends of which are connected, by rods, links, or chains W, the upper ends of the straight colters X, which are slotted longitudinally to receive the pins or bolts, by which the said colters are kept in place against the sides of the rear ends of the side longitudinal bars of the frame C while moving up and down. The right-hand colter X is designed to cut off the beveled edge which the rotary colter would leave in cutting the first furrow in a field, so as to remove an obstruction which the said right-hand plow would otherwise encounter in turning the said first furrow. The left-hand colter X serves as an ordinary colter to separate the furrow-slice to be turned by the said left-hand plow from the unplowed land.

The draft can be connected with the forward part of the frame C by a tongue, Y, or other suitable means, as the character of the power to be used may require.

The driver's seat Z can be connected with and supported from the frame C by standards or other suitable means.

I am aware that a cutter has heretofore been employed on the furrow side of a mold-board; and I am also aware that a conveyer has also been employed on the mold-board of a plow; and I am further aware that adjustable rotary and vertical colters are not broadly new; and I therefore lay no claim to them; but What I do claim, and desire to secure by Letters Patent, is—

1. In a gang-plow, the combination, with the plows D, of the guards F, secured upon the furrow edges of the said plows, substantially as shown and described, whereby the furrow-slices are prevented from slipping off the mold-boards before reaching the proper point.

2. In a gang-plow, the plows D, constructed with forwardly-projecting prongs E upon their shears and guards F upon their mold-boards, substantially as herein shown and described, whereby the furrow-slices will be raised and kept upon the mold-boards till they reach the proper point to be turned, as set forth.

3. In a gang-plow, the combination, with the plow-beams H, the plow-standards G, and the colter-standards J, of the bars I and the swiveled screws L, substantially as herein shown and described, whereby the said plows and colters can be adjusted to work at any desired depth in the ground, as set forth.

4. In a gang-plow, the combination, with the plow-beams H, the frame C, the pairs of standards N, and their connecting-bar O, of the rigid inclined levers Q, the hinged bars R, having hooks S and links T, and the pins U, substantially as herein shown and described, whereby the plows can be locked in either a working position or when raised from the ground, as set forth.

5. In a gang-plow, the combination, with the side bars, C, of the frame, the standards N, and the rotary colters K, of the levers V, the link W, and the longitudinally-slotted vertical colters X, substantially as and for the purpose set forth.

RICHARD MILLS.

Witnesses:
J. W. FIDLER,
T. H. WATSON.